United States Patent
Hosenpud et al.

(10) Patent No.: US 9,864,495 B2
(45) Date of Patent: *Jan. 9, 2018

(54) INDIRECT 3D SCENE POSITIONING CONTROL

(71) Applicant: ZSPACE, INC., Sunnyvale, CA (US)

(72) Inventors: Jonathan J. Hosenpud, Mountain View, CA (US); Michael A. Vesely, Scotts Valley, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,725

(22) Filed: Mar. 21, 2016

(65) Prior Publication Data

US 2016/0202876 A1   Jul. 14, 2016

Related U.S. Application Data

(63) Continuation of application No. 14/358,762, filed as application No. PCT/US2012/065630 on Nov. 16, 2012, now Pat. No. 9,292,184.

(60) Provisional application No. 61/561,793, filed on Nov. 18, 2011.

(51) Int. Cl.
| | | |
|---|---|---|
| *G06F 3/0481* | (2013.01) | |
| *G06F 3/0346* | (2013.01) | |
| *G06F 3/0484* | (2013.01) | |
| *G06F 3/0354* | (2013.01) | |
| *G06F 3/01* | (2006.01) | |

(52) U.S. Cl.
CPC .......... *G06F 3/04842* (2013.01); *G06F 3/011* (2013.01); *G06F 3/0346* (2013.01); *G06F 3/03545* (2013.01); *G06F 3/04815* (2013.01); *G06F 3/04845* (2013.01)

(58) Field of Classification Search
CPC ............ G06F 3/04845; G06F 3/04815; G06F 3/0346; G06F 3/011
See application file for complete search history.

(56) References Cited

U.S. PATENT DOCUMENTS

| | | | |
|---|---|---|---|
| 6,243,054 B1 | 6/2001 | DeLuca | |
| 6,628,279 B1 * | 9/2003 | Schell | ................. G06F 3/04845 345/420 |
| 7,324,085 B2 | 1/2008 | Balakrishnan | |
| 7,353,134 B2 | 4/2008 | Cirielli | |
| 7,737,965 B2 | 6/2010 | Alter | |
| 8,185,845 B2 | 5/2012 | Bjorklund | |

(Continued)

*Primary Examiner* — Ibrahim Khan

(74) *Attorney, Agent, or Firm* — Meyertons Hood Kivlin Kowert & Goetzel, P.C.; Jeffrey C. Hood; Brian E. Moore

(57) ABSTRACT

Embodiments of the present invention generally relate to interacting with a virtual scene at a perspective which is independent from the perspective of the user. Methods and systems can include either tracking and defining a perspective of the user based on the position and orientation of the user in the physical space, projecting a virtual scene for the user perspective to a virtual plane, tracking and defining a perspective of the a freehand user input device based on the position and orientation of the a freehand user input device, identifying a mark in the virtual scene which corresponds to the position and orientation of the device in the physical space, creating a virtual segment from the mark and interacting with virtual objects in the virtual scene at the end point of the virtual segment, as controlled using the device.

20 Claims, 5 Drawing Sheets

(56) References Cited

U.S. PATENT DOCUMENTS

| | | | |
|---|---|---|---|
| 8,319,773 B2* | 11/2012 | Fein | G06F 3/011 |
| | | | 345/156 |
| 2003/0142144 A1* | 7/2003 | Balakrishnan | G02B 27/2271 |
| | | | 715/848 |
| 2005/0174361 A1* | 8/2005 | Kobayashi | G02B 27/017 |
| | | | 345/633 |
| 2007/0213952 A1* | 9/2007 | Cirielli | G06F 3/0346 |
| | | | 702/152 |
| 2008/0169132 A1* | 7/2008 | Ding | G06F 3/0433 |
| | | | 178/19.02 |
| 2009/0319892 A1 | 12/2009 | Wright | |

* cited by examiner

INDIRECT 3D SCENE POSITIONING CONTROL

CROSS-REFERENCE TO RELATED APPLICATIONS

This application is a continuation of U.S. patent application Ser. No. 14/358,762, filed May 16, 2014, which is the National Stage of International Application No. PCT/US2012/065630, filed Nov. 16, 2012, and which claims benefit of priority to U.S. Provisional Patent Application No. 61/561,793, filed Nov. 18, 2011, each of which are hereby incorporated by reference.

BACKGROUND OF THE INVENTION

Field of the Invention

Embodiments of the present invention generally relate to interacting with a virtual scene using a freehand user input device. More specifically, embodiments of the present invention generally relate to interacting with a virtual scene at a perspective which is independent from the perspective of the user.

Description of the Related Art

Three dimensional (3D) computing devices have been an area of great interest in computer science for the past few decades. Research in the area of 3D technology has led to innovations for devices such as televisions, movie theaters and computing devices. Technology in this field has advanced to produce hardware and software specifically designed to generate greater realism and more natural computer-human interfaces.

Present day devices for interfacing with a 3D computing device do not provide a level of realism that users desire. Though there are a number of options for a user to choose from, such as a keyboard and mouse combination, user-positioning cameras or remotes, these devices fail to either provide depth to the virtual interaction, are not intuitive for the user or both. Keyboards provide a high level of precision but also a slow interface. Controllers and keyboards are limited in that the parameters of the 3D object are controlled by numerous buttons. Though numerous buttons might increase precision, it creates a slow, bulky and ultimately non-intuitive means for rendering and controlling a 3D object.

With regards to depth, current designs require the user to interact with the virtual scene from the user perspective. A user in a physical space can interact with a real object from any angle, including objects which cannot be seen by the user from the user's current perspective. When using an interaction device, like those described above, the projection in the virtual scene must be adjusted to allow a user to interact with an object which is not visible from the user's current perspective.

Therefore, there is a need in the art for a method and apparatus which allows the user to interact with a virtual space in a more realistic fashion.

SUMMARY OF THE INVENTION

Embodiments of the present invention generally relate to interacting with a virtual scene using a freehand user input device. In one embodiment, a method can include rendering a first image of a virtual scene projected to a virtual render plane from a first projection to be displayed on a screen; displaying the first image; viewing the image of the projection from a first eyepoint that is a normal perspective to the screen such that the projected image corresponds to the first normal perspective; positioning and orienting a freehand user interface device that contains a physical endpoint, wherein the physical endpoint defines a direction in a physical space relative to the screen, wherein the physical endpoint defines a second perspective that is other than normal to the screen such that the position and orientation of the freehand user interface device defines a second perspective that is distinct from the orientation of the first perspective; identifying a virtual position/orientation mark in the virtual scene corresponding to the physical end point in the physical space; identifying a segment in the virtual scene along a path from the mark as suggested by the second perspective direction in the physical space, where the segment suggests a path that is not normal to the render plane; and interacting with a virtual object from within the virtual scene that correlates to an intersection between the object and the segment.

In another embodiment, a method can include tracking a position and orientation of a first eye-point in a physical space as referenced from a display screen; determining a tracked perspective of the first eye-point from the position and orientation of the first eye-point as referenced from the position and orientation of the display screen; rendering a first image to be displayed on a screen of a virtual scene projected to a virtual render plane from the tracked perspective; viewing the image of the projection from the first eye-point in a physical space, such that the virtual scene corresponds to the tracked perspective; positioning and orienting a freehand user interface device comprising a physical endpoint in a physical space, such that the physical endpoint suggests a direction in the physical space relative to the screen; defining a second perspective based on the position and orientation of the physical endpoint that is other than normal to the first eye-point, such that the freehand user interface device has a second perspective that is distinct from the first perspective; identifying a virtual position and orientation mark in the virtual scene corresponding to the position and orientation of the physical endpoint in the physical space; identifying a segment along a path from the virtual position and orientation mark in the virtual space in the suggested direction; and interacting with a virtual object from within the virtual scene that correlates to an intersection between the object and the segment.

In another embodiment, a system can include a display device configured to render a first image to be displayed on a screen of a virtual scene projected to a virtual render plane from a first perspective and display an image of the projection from a first eye-point in a physical space that is a normal perspective to the screen, such that the image corresponds to the first perspective; a freehand user interface device comprising the physical endpoint in a physical space and configured to select a virtual object from within the virtual scene; and a tracking device configured to track the position and orientation of a freehand user interface device to determine a suggested direction of the physical end-point in the physical space relative to the screen, define a second perspective based on the position and orientation of the physical endpoint that is other than normal to the screen or the first eye-point, such that the freehand user interface device has a second perspective that is distinct from the first perspective, identify a virtual position and orientation mark in the virtual space corresponding to the position and orientation of the physical endpoint in the physical space, identify a segment along a path from the virtual position and orientation mark in the suggested direction of the physical endpoint and correlate an intersection between the virtual object and the segment for selection of the virtual object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Terms

Figure 1:
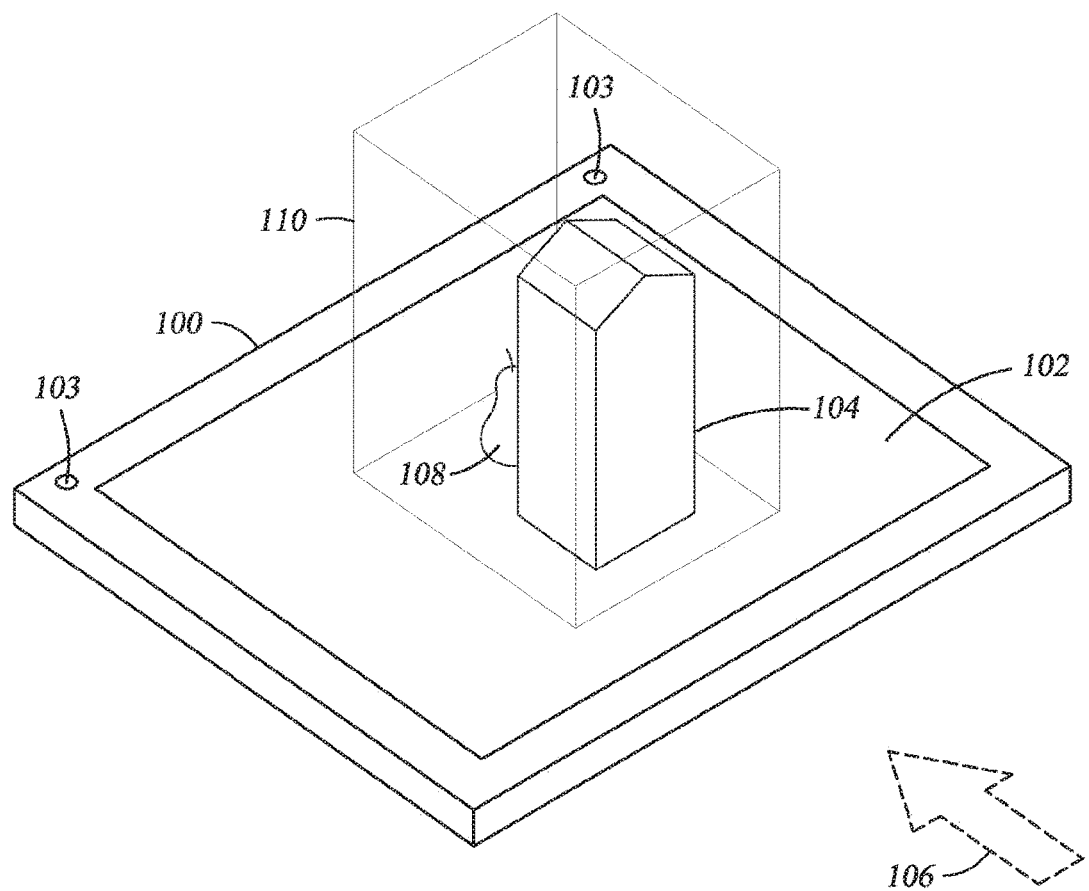
FIG. 1 is a display screen from a user perspective, according to one embodiment.

The following is a list of terms used in the present application:

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CDROM, floppy disks 104, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D virtual scene. A viewpoint, as described herein, may be referenced to the position and orientation of a user to an object.

Eyepoint—the physical location (and/or orientation) of a single eye or a pair of eyes. A viewpoint above may correspond to the eyepoint of a person. For example, generally a person's eyepoint is that person's viewpoint.

Projection—A projection is defined herein as the technique or process of representing on a plane, the spatial relation of objects as they might appear from a viewpoint. For example, each viewpoint has a distinct perspective which the display processor can determine based on the position and orientation of the user to the display. This then correlates to the viewpoint from within the virtual scene. This viewpoint then determines the projection to the plane.

Perspective—A perspective is the view from a user (herein referring to a user's head or eye or eyes). The perspective is measured from some reference location (herein the display with an integrated perspective determining tracker.)

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective which is rendered from a viewpoint which is not perpendicular to the display surface. More particularly, the term "horizontal perspective" may typically refer to a perspective which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Position—the location or coordinates of an object (either virtual or real). For example, position may include X-axis, Y-axis and Z-axis coordinates within a defined space. The position may be relative or absolute, as desired.

Orientation—Orientation is the configuration of a user or object at a single position in space. Stated another way, orientation defines the rotational movement of a user or object as tracked by the display. Orientation may include yaw, pitch, and roll information, e.g., when defining the orientation of a viewpoint.

Degrees of Freedom—The degrees of freedom of a device with regards to movement are defined by the number of independent parameters which define the devices configuration in space. The degrees of freedom for a rigid body can be reduced to the ability to change position and orientation, thus providing six degrees of freedom.

Freehand User Input Device—any device which allows a user to interact with a display using the six degrees of freedom described above.

Interpreted direction—an interpreted direction is the expected direction pointed to as referenced by an object or a user when the object or user has a designated front and the position and orientation of the object or user are known. The object or user is expected to effect change to an object with respect to its position in the direction that the designated front points to, based on the user's or object's current position and orientation. For example, a stylus with a physical endpoint is expected to effect an object that is in the direction that the physical end point is oriented towards, from the stylus' current position.

Display Configured to Interact with an Input Device from a Second Perspective.

Embodiments of the invention described herein allow the user to view the displayed virtual scene from a first perspective rendered for a first viewpoint while interacting with the display using a freehand user device from a second perspective which is rendered for a second viewpoint which is independent of the first viewpoint. An image of a virtual scene is generated by projecting the scene to a virtual render plane from a particular virtual viewpoint and displayed on a screen of a display from a first perspective. The user can then view the image displayed on the screen from the first perspective, which not only coincides with the recognized eyepoint of the user, but can change based on the re-position of the user. To interact with one or more virtual objects in the virtual scene, the user manipulates a freehand user input device which has its own second perspective which is independent from the user centric first perspective. The display device has a tracking system directly coupled to it which precisely tracks the position and orientation of the freehand user input device in close correlation to the display device. That is the physical volume of the display device and the position of the display screen is part of the correlation of the tracking system, so that freehand user input device is tracked with an understanding of where it is in relation to the display screen. It should be noted that the display device may be physically connected to the user as in a heads up display or completely separate from the user as in a table top display, hand held tablet or wall based screen. The tracking system defines the second perspective for the freehand user input device based on the tracked position and orientation of the freehand user input device in direct correlation, which can be a direct 1:1 correspondence, to the position and orientation of the display, from which the freehand user input device can interact with the image in the virtual scene.

Thus, by tracking the position and orientation of the freehand user input device and defining a new perspective based on that position and orientation, the freehand user input device can interact with the objects in the virtual scene from the perspective distinct from the tracked user perspective while rendering the virtual scene to a perspective which is normal to the user. This form of interaction will create a user experience which better represents an interaction with an object in the physical space. The invention disclosed herein is more fully explained with reference to the figures below.

A perspective which is normal to the user, as defined herein, is a perspective used in projecting a virtual scene that the user would expect based on the user's position and orientation if the objects of the virtual scene were physical objects. For example, a user viewing a tree in a meadow would expect, based on the position and orientation of the user's eyepoint, the direction of the depth in the scene (e.g. the vanishing point) to be in a certain position and orientation with consideration of believed positions and orientations of objects by the user in the exemplary tree/meadow scene.

FIG. 1 is a display 100 with a screen 102 showing a particular user perspective to the screen, according to one embodiment. The display 100 may include a screen 102. In one embodiment, the screen is a stereoscopic screen. The display 100 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform the methods described herein. The memory medium may also store data (e.g., a computer model) representing a virtual scene 110, which may be used for projecting a 3D scene of the virtual scene 110 via the screen 102. Additionally, the memory medium may store operating system software, as well as other software for operation of the computer system. Various embodiments further include receiving or storing instructions and/or data implemented in accordance with the foregoing description upon a carrier medium.

It should be noted that the embodiment of FIG. 1 is exemplary only, and other numbers of screens or combinations of computing devices are envisioned. For example, the display 100 may include only a single screen or more than two screens, or the screens may be arranged in different manners than shown. In this particular embodiment, the screen is a single screen positioned in front of, but placed flat on a table or close to a 45 degree angle to the viewer's eyepoint. While the screens are shown as flat panel screens, they may be any type of system which is capable of displaying images, e.g., projection systems.

The display 100, through the screen 102, can be configured to produce stereoscopic images. By presenting stereoscopic images, the screen 102 may present a 3D virtual scene 110 for the user. This 3D virtual scene may be referred to as an illusion since the actual provided images are 2D, but the scene is conveyed in perceived 3D via the user's perceptual interpretation of the provided images. Examples and further explanation of a stereo display system and apparatus are described in the incorporated-by-reference U.S. patent application Ser. No. 11/429,829 entitled "Three dimensional horizontal perspective workstation" (U.S. Pat. No. 7,907,167).

In order to properly view the stereoscopic images (one for each eye), the user may wear a tracking device, such as eyewear (not shown). The eyewear may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shuttering glasses, each lens is synchronized to alternations of left and right eye images provided by the screen 102. The screen 102 may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

The eyewear or other tracking device may be used in conjunction with a position input tracking device 103 to be used for tracking the eye point of a user viewing an image conveyed virtual scene 110 presented by the display 100. For example, the eyewear may allow for information that is usable to determine the position/orientation of the eyepoint of the user, e.g., via triangulation correlated to the display screen 102. The position input tracking device 103 can include an infrared tracking system to track the position of the viewer's head or use a light sensitive tracking system. Other embodiments of the position input tracking device 103 can be the triangulation method of tracking the viewer eyepoint location, such as at least two sensors (e.g., at least two CCD cameras) providing position data suitable for the head tracking objectives of the disclosure.

Accordingly, the virtual scene 110 may be rendered such that user can view the virtual scene 110 from the user's first perspective 106. The first perspective 106 can be a static or dynamic perspective. In embodiments with a dynamic perspective, the virtual scene 110 may be particularly rendered for the eyepoint of the user, using the position input tracking device 103. In some embodiments, each eyepoint may be determined separately, or a single eyepoint may be determined and an positional offset may be used to determine the other eyepoint. However, any method for tracking the position of the user's head or eyepoint is envisioned.

In static perspective embodiments, the virtual scene 110 can be rendered for a defined perspective. In one embodiment, the position input tracking device 103 can include a manually operated device by the viewer to indicate the correct display of the horizontal perspective display images. In another embodiment, the defined perspective can be a stationary perspective for the virtual scene 110. However, any method for defining a perspective for a user is envisioned.

The relationship among the position/orientation of the display 100 and the eye position of the user may be used to map a portion of the virtual/graphic space to the physical space. In essence, the physical space and components used are to be mapped in a one to one correspondence to the virtual model in order to accurately render a 3D scene of the virtual space. Examples for implementing such a system are described in the incorporated-by-reference U.S. patent application Ser. No. 11/098,681 entitled "Horizontal Perspective Display" (U.S. Patent Publication No. US 2005/0219694).

The virtual scene 110 can include a first object 104, depicted here as a building, and a second object 108, depicted here as a pear. The first virtual object 104 and the second virtual object when rendered and subsequently imaged on the screen 102 for the first perspective 106 can image the first object 104 as opaque with any virtual object beyond the first virtual object (from the corresponding user's viewpoint) being unrendered as if the first virtual object 104 obstruct the user's view of the second object 108. Since the second object is present in the virtual scene 110 but not displayed on the screen 102 from the current user's perspective, standard input devices, such as a mouse, would not be able to interact with the second object 108.

System Configured to Interact with a Device at a Second Perspective

Figure 2:
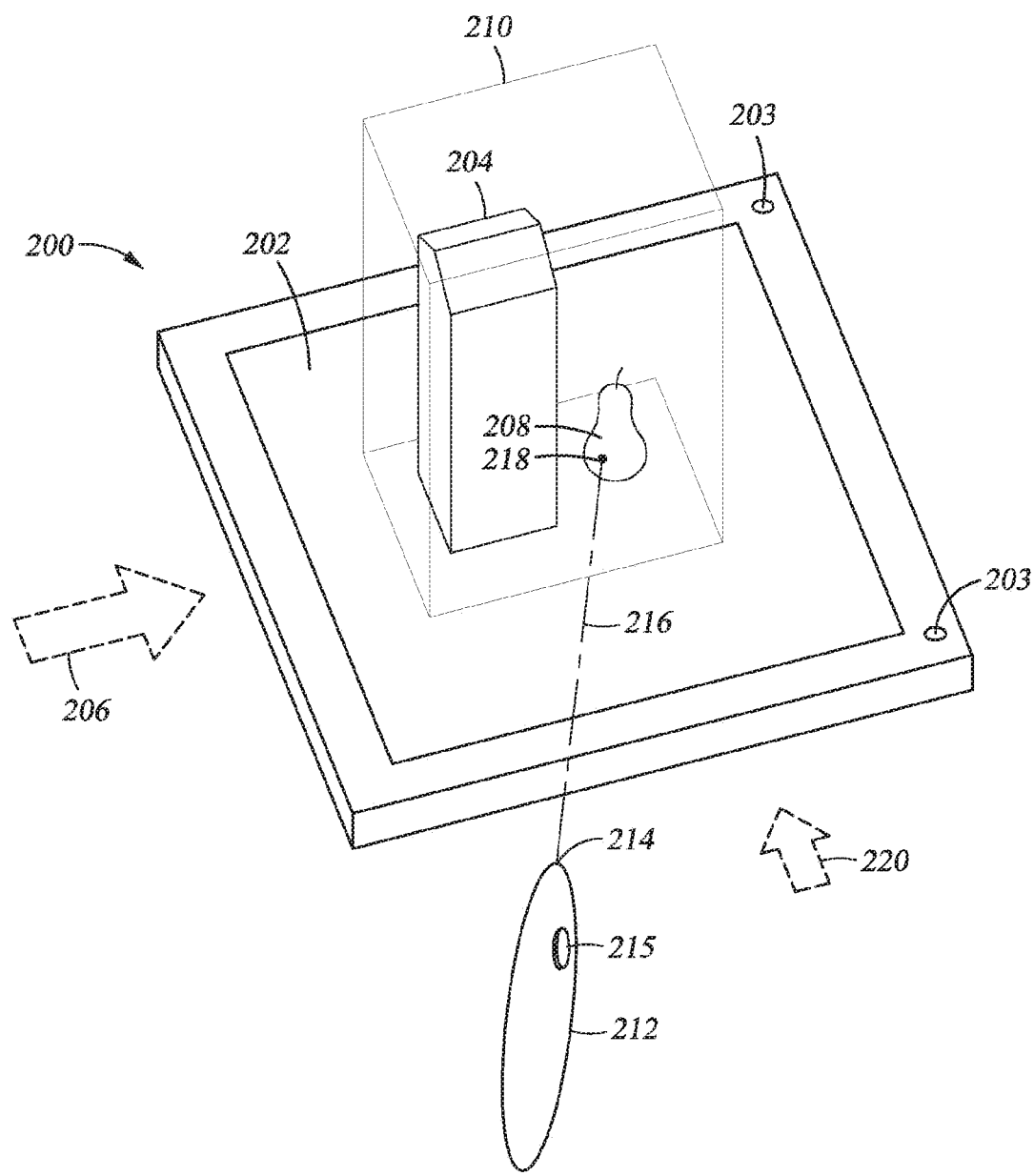
FIG. 2 depicts a display screen interaction with a freehand user input device, according to one embodiment.

FIG. 2 depicts a display screen interaction with a freehand user input device, according to one embodiment. FIG. 2 shows a display 200 with a screen 202. The display 200 described herein may be a computing device composed of one or more processors, a memory device, a display screen and supporting electronics devices. The one or more processors may be any computer processor that is capable of processing instructions for the embodiments described herein. The memory device may be any type of computer readable memory such as flash memory, a hard drive, optical memory or others. The memory device may be either local or remote to the display 200. The supporting electronics are devices that are related to the functionality of the display, such as video cards and audio devices, as well as support structures from standard computers, such as a motherboard.

Depicted on the screen 202 is a virtual scene 210. The virtual scene 210 includes the first object 204, depicted here as a building, and the second object 208, depicted here as a pear, as they would be positioned as in the virtual scene space. The virtual scene 210 is displayed on the screen 202 and rendered from the first perspective 206, thus the user is unable to see the second object 208 through the first object 204.

In this embodiment, the virtual scene 210 is depicted as being from a static perspective. However, the first perspective 206 may be a dynamic perspective, such as through glasses worn by the user and tracked by a position input tracking device 203, depicted here as a plurality of cameras. As the user changes head position and orientation in the physical space, the position and orientation of the glasses may be tracked by the position input tracking device 203. The position input tracking device 203 can then provide this information to the display 200 which determines a new first perspective 206 for the user. Other tracking methods can be incorporated without diverging from the scope of the invention disclosed herein.

In this embodiment, the user is manipulating a freehand user input device 212, depicted here as a hand held stylus. The freehand user input device 212 is any device which allows a user to virtually interact with a display screen imaged objects using the six degrees of freedom described above. More specifically, the freehand user device is any device that can be tracked in the physical space by the display 200 to allow the user to interact with the virtual scene 210 from the viewpoint of the freehand user input device 212. Examples of freehand user input devices 212, when configured to perform the method described herein, can include a stylus, a glove, a finger attachment, the user's hand/finger or other object which can be tracked for position, orientation and directionality by the display 200.

The freehand user input device 212 is configured with at least one button 215. The user can activate the button 215 to interact with one or more virtual objects in the virtual scene 210, based on certain contexts, such as moving an object or selecting an object. Further, the freehand user input device 212 can have a physical endpoint 214. The physical endpoint may be any point that is known to the processing unit as a point or region proximate to the tracked position/orientation of the freehand user input device. The display 200 can track the position of the stylus 212 using the position input tracking device 203.

The freehand user input device has its own perspective, a second perspective 220. The second perspective 220 is not necessarily different from the first perspective 206. However, the second perspective 220 is independent of the first perspective 206. The display 200 can use the position input tracking device 203 to determine the position and orientation of the freehand user input device 212 in the physical space. In further embodiments, the position input tracking device 203 simply receives telemetry data to determine the position/orientation of the freehand user input device 212. The telemetry data can be from the freehand user input device 212 or from a secondary source, such as a remote sensor. Telemetry data can include information from various devices, such as a gyroscope or cameras, which provide information regarding the position, orientation and status of the freehand user input device 212. In further embodiments, the position input tracking device 203 collects information which is either enhanced by, used in conjunction with or supplanted by received telemetry data from one or more sources to determine the position and orientation of the freehand user input device 212.

Based on the determined position and orientation of the freehand user input device 212, the display determines the second perspective 220. The second perspective 220 correlates with the imagined perspective of the freehand user input device 212. In one embodiment, the second perspective 220 is not rendered on the screen 202. However, the freehand user input device 212 can interact with the virtual scene 210 objects depicted therein, including the first object 204 and the second object 208, from the second perspective 210.

The determination of position and orientation of the freehand user input device 212, and subsequent determination of the second perspective 220 by the display 200, can be a static determination or a dynamic determination. In one embodiment, the second perspective 220 can be determined over a period of time, as the freehand user input device 212 changes position and/or orientation, the display 200 determines the new second perspective 220. In another embodiment, the second perspective 220 is determined by the display 200 at a specific period of time, such as a period of time indicated by a keystroke, a button click or a calibration period. The freehand user input device 212 is positioned and oriented at a position/orientation which the display 200 permanently or semi-permanently defines as the second perspective.

The freehand user input device 212 is depicted in this embodiment as a stylus. However, it is envisioned that the freehand user input device can be any device which operates with six degrees of freedom and can interact with the virtual scene 210 from the second perspective 220. For example, the freehand user input device 212 can be a stylus, a glove or a finger attachment. The depiction of the freehand user input device 212 is not intended to be limiting of the scope of this invention.

The freehand user input device 212 can have a corresponding mark (not shown) in the virtual scene 210 which corresponds to the physical endpoint 214 of the freehand user input device 212. The mark can have a corresponding position and orientation to the physical endpoint 214 on the freehand user input device 212. A segment 216, depicted as a virtual beam, can extend from the mark, using some aspect or vicinity of the mark as starting point of the beam and where the beam extends out in the interpreted direction as identified in the physical space as the tracked pointing direction of the freehand user input device 212. When depicted visually, such as a virtual beam, the segment 216 can be depicted in the virtual space 210 in the apparent direction of the physical endpoint 214. In further embodiments, the segment 216 is not be visible in the virtual scene 210 or the segment may have path based on certain other criteria resulting in a curved line, region or other geometric boundary conditions.

The segment 216 has a point of intersection 218 in the virtual scene 210. The point of intersection 218 may correspond with the position and orientation of the physical endpoint 214. Further, the point of intersection 218 may correspond with a virtual beam imaged as a continuous line extending from the physical endpoint, such as depicted for segment 216, extending from the physical endpoint 214 of the freehand user input device 212, in the interpreted direction of the freehand user input device 212 wherein the movement of the segment 216 is blocked by second object 208. In this embodiment, the second object 208 is perceived as being a solid (or partially transparent) object, thus the passage of the segment 216 is blocked by the second object 208 thus ascribing a point of intersection 218 to the virtual solid surface of the second object 208. Further, the point of intersection 218 may refer to a virtual end point in the virtual space 210, such that the segment 216 ends in the virtual space 210 without an apparent collision. Points of intersection may be determined by the characterization of the virtual beam. In one embodiment, the virtual beam may extend indefinitely, then the point of intersection may be where the virtual object closest to beam, where two or more virtual object are in the path of the beam is the virtual object of intersection. In another embodiment where the virtual beam may have a finite extension from the corresponding mark, the virtual object closest to the extension point, but still on the path between the corresponding mark and the extension point of the finite extension is the point (or virtual object) of intersection, where two or more virtual object are in this confined path of the beam.

By activating the button 215, the user can interact with the second object 208 at the point of intersection 218 to create a response in the second object 208. The response can be any form of interaction with a virtual object, such as deleting, moving, or highlighting the object. As the point of intersection 218 may affect an object which is not imaged and hence, not visible from the first perspective 206, such as the second object 208, the effect of the interaction may not necessarily be rendered for imaging on the screen 202.

Figure 3:
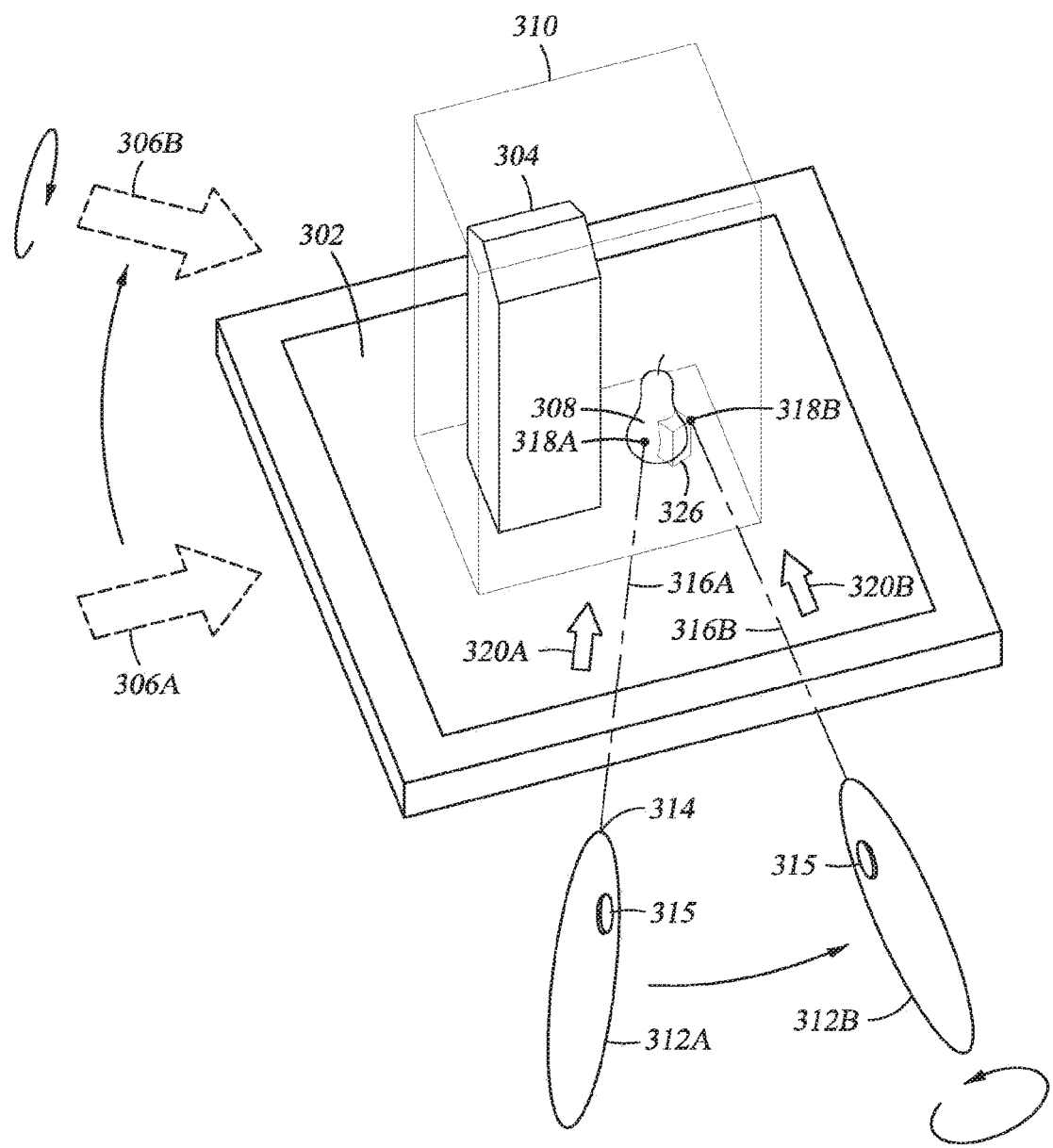
FIG. 3 depicts a system for interacting with a virtual scene from a perspective not normal to the user, according to one embodiment.

FIG. 3 depicts a system for interacting with a virtual scene from a perspective not normal to the user, according to another embodiment. As above, FIG. 3 depicts a screen 302 on a display 200, explained with reference to FIG. 2. The screen 302 can display a virtual scene 310 which is rendered from and for a first perspective 306A. The display 200 can track the first user perspective 306A through previously described means, such as through glasses worn by the user tracked by the position input tracking device 203, described with reference to FIG. 2.

The virtual scene 310 can include a first virtual object 304 and a second virtual object 308. As in the previous embodiment, the first object 304 is rendered in the virtual scene 310 for the first perspective 306A. The second virtual object 308 is obstructed by the first virtual object 304, given the projection vis. a vis. the first user perspective and thus the projection based rendering does not include rendering the second virtual object 308 from the first user perspective 306A, based projection in the virtual scene 310.

In one embodiment, the user is facing into the screen 302, where a stereo graphic object of a building is rendered and perceived as the first object 304. The first object 304 could be rendered to be perceived in front of a screen 302, behind a display screen or crossing both sides of the display screen. The first object 304 in one embodiment can have axis extension handles emanating from the three dimensions of the first object 304. An X axis handles are extending to the left and right of the first object 304. The Y axis handles are extending to the top and bottom of the first object 304. The Z axis handles are extending behind and in front of the first object 304. Because of the object's rendering, the viewer perceives the Z axis handles (behind and in front of the first object 304) as a point or at least with a barely perceptible handle. The problem here is that the user may wish to select a portion of the Z axis handle for manipulation, which is not easily accessible in its current position. A further problem may be that the user may have positioned the first object 304 in a manner that actively moving it may affect the scene in a negative way, so moving the first object 304 is not desirable, yet grabbing the handle is needed.

In this embodiment, the first perspective 306 is continually determined based on the position and orientation of the user. In this embodiment, the user makes a change in position and a change in orientation, such as by moving to the side of the display 200 and standing up. The display 200 tracks the change in position based on the position of the glasses as tracked by the position input tracking device 203. Using the new position and orientation of the user, as referenced from the position and orientation of the display 200, the display 200 processor determines a new first perspective 306B. The new first perspective 306 determined by the display 200 is used to render the virtual scene 310, thus providing a projection of the virtual scene 310, including the first object 304 and the second object 308 to the render plane based on the viewpoint of the user at the new position and orientation.

In this embodiment, the user is manipulating a freehand user input device 312A. The freehand user input device 312 is configured with at least one button 315 and a physical endpoint 314. The display 200 can track the position of the stylus 312 using the position input tracking device 203, as described with reference to FIG. 2.

Referring back to the X, Y, and Z-axis handle manipulation, the effect of tilting the head is that the virtual scene 310 is re-rendered with all objects not being directly affected, but the perspective of the user and hence the corresponding projection of the virtual objects in context of the current frustum is rendered for a stereo display that presents the Z axis to the user in a manner that the Z axis is now tilted from the user's perspective, presenting a clearer view of the Z axis of the object. The user may utilize the freehand user input device 312A to select the point of interest along the Z axis and may manipulate the first object 104 as desired independent of the perspective of the user to the z axis.

Based on the determined position and orientation of the freehand user input device 312, the display 200 determines a second perspective 320A. As above, the second perspective 320A correlates with the imagined perspective of the freehand user input device 312. The freehand user input device 312 can have a mark (not shown) in the virtual scene 310 which corresponds to the physical endpoint 314 of the freehand user input device 312A. The mark can have a corresponding position and orientation to the physical endpoint 314 on the freehand user input device 312. A segment 316A, depicted as a virtual beam, can extend from the corresponding mark in the virtual scene space. As above, the segment 316A can be depicted in the virtual space 310 in the apparent direction of the physical endpoint 314. Further, the segment 316A has a point of intersection 318A in the virtual scene 310. The point of intersection 318A may correspond with the position and orientation of the physical endpoint 314.

By activating the button 315, the user can interact with the second object 308 at the point of intersection 318A to create a response in the second object 308. In this embodiment, the interaction with the second object 308 is depicted as the formation of a selection shape 326, depicted here as a cube. The interaction at the point of intersection 318A is a beginning point formed on the outer edge of the selection shape 326.

The user can then change the position and orientation of the freehand user input device 312A to a second position and orientation which is depicted as freehand user input device 312B. The display 200 tracks the new position and orientation of the freehand user input device 312B and determines the second perspective 320B. The second perspective 320B also determines a new mark in the virtual scene 310 from which segment 316B and point of intersection 318B are formed, as described previously. The user can once again activate the button 315 to mark an ending point based on the position of the point of intersection 318B. The size and directionality of the shape can be determined a combination of the second perspectives 320A and 320B, an imaginary diagonal formed between the two points of intersection 318A and 318B or by other means.

As shown in relation to the second object 308, the user selects a region of the second object 308 to include a number of access points. Traditionally, the selection process is by extending a growing region (e.g. a rectangle) that is normal in relation to a display. In the context of a stereo 3D display, the selection process is by extending a region (e.g. a cubic), which is drawn parallel, perpendicular or oblique to the display screen using a handheld pointing device or other user input. As shown previously, the user may move their view position to the see the region of interest, then using the freehand user input device 312, the user initiates a region selection action, by placing the segment 316 at a point of interaction 318 within the user's view volume. This sets an initial anchor point. The user then moves the freehand user input device 312 from that anchor point location. The selection shape 326 begins to form, with one axis at the anchor point defined by point of intersection 318A and the second axis at the pointing device's rendered object representation tip. The selection region evolves, based on the perspective of the user input device, which may be independent of the user's perspective. The selection shape 326 forms as the freehand user input device 312 is moved. The angle of the selection shape 326 in relation to the screen 302 is defined by the angle of the positioned freehand user input device 312 to the screen 302. In another embodiment, the angle of the selection shape 326 changes as the freehand user input device 312 is angled. In another embodiment, the angle of the selection shape 326 formed is fixed at the time of the initial point being identified. Then the angle of the freehand user input device 312 at the time the initial point is set, sets the angle of the created formed selection shape 326, independent of the angle the user holds the freehand user input device 312 while approaching the final point of intersection 318B defining the selection region selection shape 326.

Method for Interacting with a Device at a Second Perspective

Figure 4:
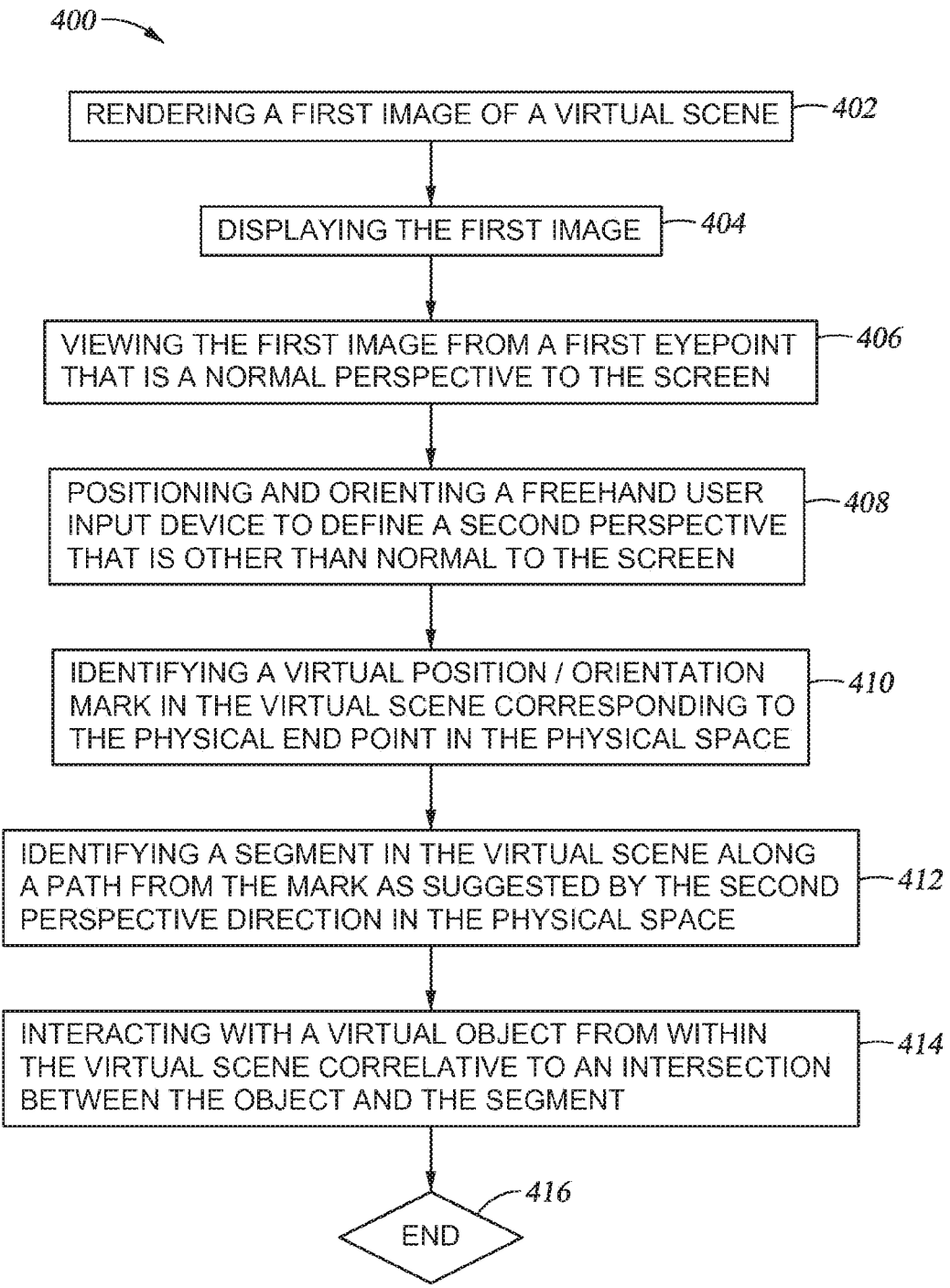
FIG. 4 is a block diagram of a method for interacting with a virtual scene according to one embodiment.

FIG. 4 is a block diagram of a method for interacting with a virtual scene according to one embodiment. The method 400 can include rendering a first image (e.g. the image being a stereo pair) of a 3D virtual scene, as in 402. One or more images of the 3D virtual scene may be presented by the display as projected to the virtual render plane. As previously described, the images may be monoscopic or stereoscopic. The virtual scene may include one or more objects which are rendered as part of the virtual scene on the screen. In one embodiment, the method can include rendering a first image of a virtual scene projected to a virtual render plane from a first projection to be displayed on a screen, wherein the projection can be either oblique or non-oblique, depending upon the user being at a oblique or non-oblique perspective to the display screen.

The method 400 can include displaying the first image, as in 404. In this embodiment, the first image is displayed on at least one screen of the display. The 3D virtual scene may be presented by a single screen or a plurality of screens. In one embodiment, the 3D virtual scene may be presented by a single screen as either a monoscopic or a stereoscopic image. For example, the screen may present a first stereoscopic image and a second stereoscopic image of a 3D virtual scene, either simultaneously or alternatingly. The first stereoscopic image can be received by the first eye and the second stereoscopic image can be received by the second eye. In another example, the screen may present a monoscopic image of the 3D virtual scene. In another example, there may be more than one screen, each screen with its own monoscopic or stereoscopic image from their unique projections of the 3D virtual scene.

In a further embodiment, the 3D virtual scene may be presented by a vertical screen and an off-axis screen, such as a horizontal screen. For example, the vertical screen may present a first stereoscopic image, e.g., according to a vertical perspective, and the horizontal screen may present a second stereoscopic image, e.g., according to a horizontal perspective. These two stereoscopic images may form or convey the 3D scene to the user. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

The method 400 can include viewing the first image from a first eyepoint that is a normal perspective to the screen, as in 406. An image of the 3D virtual scene may be presented (displayed) from the first perspective. For example, the first perspective may be based on an eyepoint of a user viewing the 3D virtual scene. In one embodiment, the method may include using a perspective which is anticipated as normal to the user, e.g., by defining an expected position for the eyepoint of the user viewing the 3D virtual scene. Stated another way, the perspective presented by the 3D virtual scene can be normal to the user and unchanging based on the user position and orientation.

The method 400 can include positioning and orienting a freehand user input device to define a second perspective that is other than normal to the screen, as in 408. Generally speaking, the freehand user input device can be positioned and oriented in the physical space. The position and orientation of the freehand user is tracked by the display and the second perspective is determined based on the position and orientation tracked. As stated previously, the second perspective is independent of the first perspective. In one or more embodiments, the second perspective is not normal to the perspective of the user. The display can use the position input tracking device to determine the position and orientation of the freehand user input device in the physical space. In further embodiments, the position input tracking device can use telemetry data to determine the position of the freehand user input device. The telemetry data can be from the freehand user input device or other sources. As well, the position input tracking device can use tracked position and orientation, telemetry data or combinations thereof to define the second perspective. As further telemetry data is received and/or further positions and orientations of the freehand user input device are tracked, the second perspective can be redefined by the display to allow interaction from the freehand user input device.

The method 400 can include identifying a virtual position/orientation mark in the virtual scene corresponding to the physical end point in the physical space, as in 410. Based on the tracked position and orientation of the freehand user input device, the display can identify a mark in the virtual scene which corresponds to the position of and contains orientation information from the physical endpoint of the freehand user input device. The mark may be either displayed in the virtual scene or identified in the virtual scene without further rendering.

The method 400 can include identifying a segment in the virtual scene along a path from the mark as suggested by the second perspective direction in the physical space, as in 412. The segment can be a line segment which is identified as starting from the position of the mark as projected to the render plane. The line segment can then extend in the anticipated direction of the physical endpoint on the freehand user input device. As described above, the line segment can have a point of intersection with the virtual scene. The point of intersection can be a predefined position in the virtual scene or it can be a position that marks a collision with an apparent virtual object (e.g. opaque or partial transparent object), such as the first object shown in FIGS. 1-3.

The method 400 can include interacting with a virtual object from within the virtual scene correlative to an intersection between the object and the segment, as in 414. The freehand user input device may be used to interact with the presented 3D virtual scene, such as by manipulating objects in a screen space of the 3D virtual scene. For example, freehand user input device may be used to directly interact with virtual objects of the 3D virtual scene (via the viewed projected objects). However, this direct interaction may only be possible with "virtual space" portions of the 3D virtual scene. Thus, at least a portion of the 3D virtual scene may be presented in the virtual space, which is in front of or otherwise outside of the at least one screen. In some embodiments, the virtual space portion of the 3D virtual scene may appear as a hologram above the surface of the screen. Thus, virtual space refers to a space which the user is able to freely move and interact with (e.g., physical space upon which the illusion is apparently projected) rather than a space the user cannot freely move and interact with (e.g., where the user is not able to place his hands in the space, such as below the screen surface). The user can interact with virtual objects in the virtual space because they are proximate to the user's own physical space. An inner volume is located behind the viewing surface and presented objects appear inside the physically viewing device. Thus, objects of the 3D virtual scene presented within the inner volume do not share the same physical space with the user and the objects therefore cannot be directly, physically manipulated by hands or hand-held tools such as the freehand user input device. That is, they may be manipulated indirectly, e.g., via a virtual beam from a freehand user input device into the virtual scene.

In some embodiments, this virtual space interaction may be achieved by having a 1:1 correspondence between the virtual objects (e.g., in the screen space) and projected objects (e.g., in the physical space). Thus, an accurate and tangible physical interaction is provided by allowing a user to touch and manipulate projected objects with his hands or hand held tools, such as freehand user input device. This 1:1 correspondence of the virtual elements and their physical real-world equivalents is described in more detail in U.S. Patent Publication No. 2005/0264858, which was incorporated by reference in its entirety above. This 1:1 correspondence, based on a true tracking of user and input devices absolutely referenced to the display screen and may include added referencing to one or more geospatial references, may allow the user to physically and directly access and interact with projected objects of the 3D virtual scene. This 1:1 correspondence may utilize the creation of a common physical reference plane, as well as, the formula for deriving its unique x-axis, y-axis, and z-axis spatial coordinates, thereby correlating the physical coordinate environment to the virtual coordinate environment. Additionally, the 1:1 correspondence allows the user's movement of virtual objects or other interaction to be the same in physical space and in presented space. However, other embodiments are envisioned where there is a ratio between the distance of the user's physical movement and the corresponding movement in the presented 3D virtual scene.

Virtually interacting with the virtual objects in the virtual scene can include any known type of interaction with a virtual object, such as selecting, changing position/orientation, deleting, forming a selecting shape over a portion of the object or other interactions. Once the interaction is done, the method 400 can be ended, as in 416.

Figure 5:
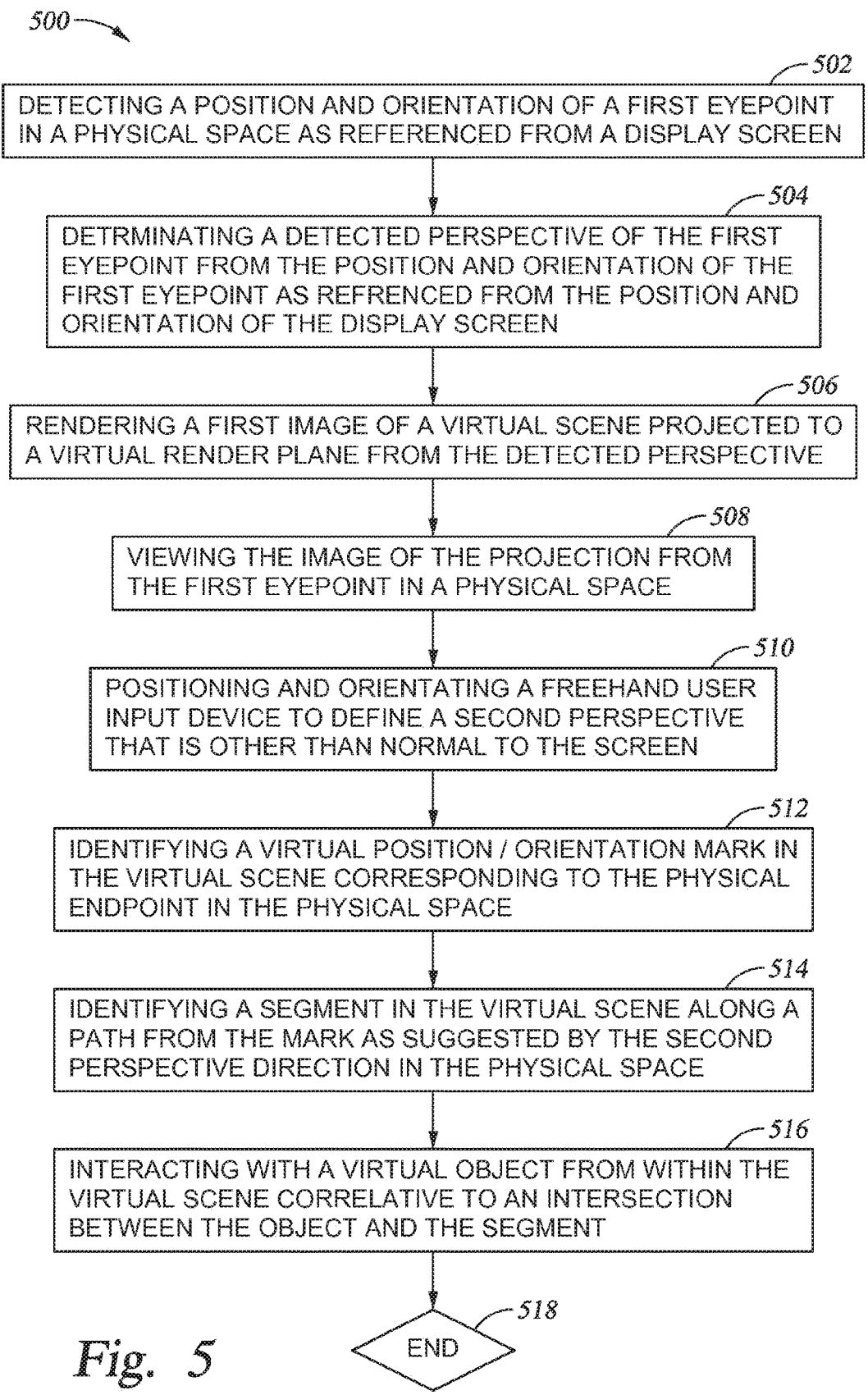
FIG. 5 is a block diagram of a method for interacting with a virtual scene according to another embodiment.

FIG. 5 is a block diagram of a method for interacting with a virtual scene according to another embodiment. The method 500 can include tracking a position and orientation of a first eyepoint in a physical space as referenced from a display screen, as in 502. The user can be positioned in proximity to the display including the position input tracking devices. The position input tracking devices, such as cameras, can use images of the user or a device the user is wearing, which is stationary to the user (such as a pair of glasses) to determine the position and orientation of the user in the physical space. Further, the device worn by the user may also provide telemetry data to the display, thus providing an external source of positioning and orientation data.

The method 500 can include determining a tracked perspective of the first eyepoint from the position and orientation of the first eyepoint as referenced from the position and orientation of the display screen, as in 504. Based on the tracked position and orientation of the eyepoint, the display can then determine the perspective that the virtual image should be rendered from. As the user position changes, the user's view of the virtual scene will change, thus allowing the user to view objects that were previously not rendered from imaging, such as the first object discussed in FIGS. 1-3.

The tracking of position and orientation can be either a static event or a dynamic. In static embodiments, the display can track the position of the user based on an event, such as the user coming into proximity of the display, the user pressing a predefined key, a remote command or other preprogrammed event. The device would then determine the position of the user which would be user during the duration of the user interaction or for a portion thereof, as defined by a secondary event. In dynamic embodiments, the display can constantly or semi-constantly track the position and orientation of the user. This constant or semi-constant tracking can be used by the display to determine a moment by moment user perspective to subsequently display the virtual scene for the user. In preferred embodiments, the perspective is updated by a constant tracking of the user position and orientation.

The method may determine the eyepoint of the user using various techniques, such as eyewear which may be used to provide eyepoint position information, triangulation, head/eye tracking, etc. Accordingly, the 3D scene may be rendered such that the user can view the 3D virtual scene based on the eyepoint of the user. More specifically, when the 3D virtual scene is based on the user's eyepoint, the 3D virtual scene is rendered based on the perspective as would be seen by the viewer. A displayed object retains the correct perspective as well as the correct offset 15 positioning and orientation from the display device as perceived by the viewer as long as the display is tracking the position and orientation and redefining the perspective.

The method 500 can include rendering a first image of a virtual scene projected to a virtual render plane from the tracked perspective, as in 506. The display can produce a first image of a 3D virtual scene using the tracked perspective, either static or dynamic. The 3D virtual scene can then be projected to the render plane. This projection produces the illusion of the 3D virtual scene in both the virtual space and the inner volume. In this embodiment, the interaction is expected to be more realistic, as the first perspective being constantly updated for the position and orientation of the user.

The method 500 can include viewing the image of the projection from the first eyepoint in a physical space, as in 508. An image of the 3D virtual scene may be presented (displayed) from the first perspective, as the perspective is presently and as the perspective changes based on the tracking of the position and orientation of the user. For example, the first perspective may be based on an eyepoint of a user viewing the 3D virtual scene. In one embodiment, the method may include using a perspective which is anticipated as normal to the user, e.g., by defining an expected position for the eyepoint of the user viewing the 3D virtual scene. Stated another way, the perspective presented by the 3D virtual scene can be normal to the user and unchanging based on the user position and orientation.

The method 500 can include positioning and orienting a freehand user input device to define a second perspective that is other than normal to the screen, as in 510. Generally speaking, the freehand user input device can be positioned and oriented in the physical space independent of the tracked perspective of the user. The position and orientation of the freehand user input device is tracked by the display and the second perspective is determined based on the position and orientation tracked. As stated above, the display can use the tracked position and orientation of the freehand user input device from position input tracking devices, telemetry from one or more sources or combinations thereof to determine the position and orientation of the freehand user input device. Even though the freehand user input device has a second perspective, its corresponding virtual objects within the virtual scene space are rendered with a projection that correlates to the user's first perspective, allowing the user to see the display screen imaging of the virtual objects correlating to the freehand user input device in the same user perspective projection as the above described virtual objects.

The method 500 can include identifying a virtual position/orientation mark in the virtual scene corresponding to the physical end point in the physical space, as in 512. Based on the tracked position and orientation of the freehand user input device, the display can identify a mark in the virtual scene which corresponds to the position of and contains orientation information from the physical endpoint of the freehand user input device. As in the previous embodiment, the mark may be either displayed in the virtual scene or identified in the virtual scene without further rendering.

The method 500 can include identifying a segment in the virtual scene along a path from the mark as suggested by the second perspective direction in the physical space, as in 514. The segment including a point of intersection can be interpreted or depicted in this embodiment. The segment can be a line segment which is identified as starting from the position of the mark as projected to the render plane. The line segment can then extend in the anticipated direction of the physical endpoint on the freehand user input device. The point of intersection can be the ending point of the segment.

The method 500 can include interacting with a virtual object from within the virtual scene correlative to an intersection between the object and the segment, as in 516. The freehand user input device may be used to interact with the presented 3D virtual scene, such as by the appearance of manipulating objects in a screen space of the 3D virtual scene. For example, freehand user input device may be used to directly interact with virtual objects of the 3D virtual scene (via the viewed projected objects). This interaction occurs from the second perspective and thus can be an invisible interaction to the user. As stated previously, interacting with the objects in the virtual scene can any known form of interaction with a virtual object, such as selecting, changing position/orientation, deleting, forming a selecting shape over a portion of the object or other interactions.

Once the interaction is done, the method 500 can be ended, as in 518.

CONCLUSION

Embodiments described herein relate to systems and methods of correcting the position and orientation of a pointer as rendered in a virtual space with reference to a freehand user input device. By activating a button on a freehand user input device, the device can be displaced in position and/or orientation from the intended target of the user. By collecting information regarding the position and orientation of the freehand user input device in the physical space and the pointer in the virtual space over time, determining the time point of activation for the button, and using a temporal offset to associate the activation of the button with a previous position and orientation of the pointer in the virtual space, the movement can be accommodated for and the proper target can be selected in the virtual space.

While the foregoing is directed to embodiments of the present invention, other and further embodiments of the invention may be devised without departing from the basic scope thereof, and the scope thereof is determined by the claims that follow.

What is claimed is:

1. A method for interacting with a virtual object from within a virtual scene projected to a virtual render plane, comprising:
   determining, via an optical tracking device, a first position and orientation of a physical endpoint of a user interface device in a physical space, wherein the position and orientation is with respect to a display device rendering the virtual scene;
   determining a perspective of the user interface device based on the determined position and orientation, wherein the perspective is with respect to the display device, and wherein the perspective is not normal to the virtual render plane;
   identifying a virtual position and orientation of a virtual endpoint in a virtual scene, wherein the virtual position and orientation of the virtual endpoint in the virtual scene correspond to the position and orientation of the physical endpoint in the physical space;
   identifying a segment in the virtual scene along a path from the virtual endpoint based on the perspective of the user interface device, wherein the segment indicates a path that is not normal to the virtual render plane; and
   correlating an intersection between the virtual object and the segment, including receiving, via the user interface device, user input to select a virtual object via a selection shape, comprising:
      receiving user input to select a first point in the virtual scene from the perspective in accordance with a first intersection;
      receiving user input to select a second point in the virtual scene from a different perspective in accordance with a second intersection, wherein the second perspective is based on a second position and orientation of the user interface device in the physical space, and wherein the second position and orientation is determined via the optical tracking device; and
      creating a rectangular volume between the first point and the second point, wherein planes of the rectangular volume are oblique in relation to the virtual render plane, wherein the rectangular volume forms the selection shape.

2. The method of claim 1,
   wherein the user interface device is a stylus.

3. The method of claim 1, further comprising:
   tracking changes in position and orientation of the physical endpoint in the physical space; and
   moving the virtual endpoint within the virtual scene based upon the tracking.

4. The method of claim 1, further comprising:
   receiving telemetry data from the user interface device, wherein the telemetry data is used in conjunction with information collected by the optical tracking device to determine the position and orientation of the user interface device.

5. The method of claim 1, further comprising:
altering the virtual object within the virtual scene, wherein the altering comprises correlating changes in position and orientation of the physical endpoint in physical space to changes in position and orientation of the virtual endpoint in the virtual space.

6. The method of claim 5,
wherein altering the virtual object within the virtual scene comprises changing the virtual object such that the virtual object, when viewed from a perspective of a user, is projected in the virtual scene to be substantially identical to the virtual object projected in the virtual scene as the virtual object would appear when viewed from the perspective prior to moving.

7. The method of claim 1,
wherein the perspective correlates to the position and orientation of the physical endpoint and wherein the perspective changes with changes in the position and/or orientation of the physical endpoint.

8. The method of claim 1,
wherein the second point is selected at the third perspective which is changed based on a new position and orientation of the physical endpoint.

9. A non-transitory computer readable memory medium storing program instructions executable by a processor to:
determine, via an optical tracking system, a first position and orientation of a physical endpoint of a user interface device in a physical space, wherein the position and orientation is with respect to a display device rendering a virtual scene projected to a virtual render plane;
determine a perspective of the user interface device based on the determined position and orientation, wherein the perspective is with respect to the display device, and wherein the perspective is not normal to the virtual render plane;
identify a virtual position and orientation of a virtual endpoint in a virtual scene, wherein the virtual position and orientation of the virtual endpoint in the virtual scene correspond to the position and orientation of the physical endpoint in the physical space;
identify a segment in the virtual scene along a path from the virtual endpoint based on the perspective of the user interface device, wherein the segment indicates a path that is not normal to the virtual render plane; and
correlate an intersection between a virtual object and the segment, via a selection shape, wherein to correlate the intersection, the program instructions are further executable to:
receive user input to select a first point in the virtual scene from the perspective in accordance with a first intersection;
receive user input to select a second point in the virtual scene from a different perspective in accordance with a second intersection, wherein the second perspective is based on a second position and orientation of the user interface device in the physical space, and wherein the second position and orientation is determined via the optical tracking device; and
create a rectangular volume between the first point and the second point, wherein planes of the rectangular volume are oblique in relation to the virtual render plane, wherein the rectangular volume forms the selection shape.

10. The non-transitory computer readable memory medium of claim 9,
wherein the program instructions are further executable to:
track changes in position and orientation of the physical endpoint in the physical space; and
move the virtual endpoint within the virtual scene based upon the tracking.

11. The non-transitory computer readable memory medium of claim 9,
wherein the program instructions are further executable to:
receive telemetry data from the user interface device, wherein the telemetry data is used in conjunction with information collected by the optical tracking device to determine the position and orientation of the user interface device.

12. The non-transitory computer readable memory medium of claim 9,
wherein the program instructions are further executable to:
alter the virtual object within the virtual scene, wherein to alter the virtual object the program instructions are further executable to correlate changes in position and orientation of the physical endpoint in physical space to changes in position and orientation of the virtual endpoint in the virtual space.

13. The non-transitory computer readable memory medium of claim 9,
wherein the perspective correlates to the position and orientation of the physical endpoint and wherein the perspective changes with changes in the position and/or orientation of the physical endpoint.

14. The non-transitory computer readable memory medium of claim 9,
wherein the second point is selected at the third perspective which is changed based on a new position and orientation of the physical endpoint.

15. A system comprising:
a display device;
an optical tracking system;
a memory; and
a processor in communication with the memory, wherein the processor is configured to:
determine, via the optical tracking system, a first position and orientation of a physical endpoint of a user interface device in a physical space, wherein the position and orientation is with respect to the display device rendering a virtual scene projected to a virtual render plane;
determine a perspective of the user interface device based on the determined position and orientation, wherein the perspective is with respect to the display device, and wherein the perspective is not normal to the virtual render plane;
identify a virtual position and orientation of a virtual endpoint in a virtual scene, wherein the virtual position and orientation of the virtual endpoint in the virtual scene correspond to the position and orientation of the physical endpoint in the physical space;
identify a segment in the virtual scene along a path from the virtual endpoint based on the perspective of the user interface device, wherein the segment indicates a path that is not normal to the virtual render plane; and correlate an intersection between a virtual object and the segment via a selection shape, wherein to correlate the intersection, the processor is further configured to:
  receive user input to select a first point in the virtual scene from the perspective in accordance with a first intersection;
  receive user input to select a second point in the virtual scene from a different perspective in accordance with a second intersection, wherein the different perspective is based on a second position and orientation of the user interface device in the physical space, and wherein the second position and orientation is determined via the optical tracking device; and
  create a rectangular volume between the first point and the second point, wherein planes of the rectangular volume are oblique in relation to the virtual render plane, wherein the rectangular volume forms the selection shape.

16. The system of claim 15,
wherein the processor is further configured to:
  track changes in position and orientation of the physical endpoint in the physical space; and
  move the virtual endpoint within the virtual scene based upon the tracking.

17. The system of claim 15,
wherein the processor is further configured to:
  receive telemetry data from the user interface device, wherein the telemetry data is used in conjunction with information collected by the optical tracking device to determine the position and orientation of the user interface device.

18. The system of claim 15,
wherein the processor is further configured to:
  alter the virtual object within the virtual scene, wherein to alter the virtual object the program is configured to correlate changes in position and orientation of the physical endpoint in physical space to changes in position and orientation of the virtual endpoint in the virtual space.

19. The system of claim 15,
wherein the perspective correlates to the position and orientation of the physical endpoint and wherein the perspective changes with changes in the position and/or orientation of the physical endpoint.

20. The system of claim 15,
wherein the second point is selected at the third perspective which is changed based on a new position and orientation of the physical endpoint.

* * * * *